US006081085A

United States Patent [19]

Ohashi et al.

[11] Patent Number: 6,081,085
[45] Date of Patent: Jun. 27, 2000

[54] POWER WINDOW APPARATUS

[75] Inventors: Nobuaki Ohashi, Tsurugashima; Hiroshi Sato, Minato-ku, both of Japan

[73] Assignee: Toyo Denso Kabushiki Kaisha, Tokyo, Japan

[21] Appl. No.: 09/288,426

[22] Filed: Apr. 8, 1999

[30] Foreign Application Priority Data

Apr. 9, 1998 [JP] Japan .................................... 135864

[51] Int. Cl.[7] .................................................. H02P 7/00

[52] U.S. Cl. ......................... 318/283; 318/266; 318/456; 318/466

[58] Field of Search .................................. 318/280–293, 318/470, 440–468, 469, 266; 364/492, 184, 480, 481; 307/10.6, 10.1, 10.5; 200/5 R, 7, 4, 553, 16 C, 558; 361/58, 27; 340/825.34, 825.31

[56] References Cited

U.S. PATENT DOCUMENTS

| | | | |
|---|---|---|---|
| 4,001,661 | 1/1977 | Terabayashi | 318/264 |
| 5,097,186 | 3/1992 | Kokubu | 318/280 |
| 5,406,270 | 4/1995 | Van Lente | 340/825.34 |
| 5,488,276 | 1/1996 | Nishibe | 318/473 |
| 5,559,375 | 9/1996 | Jo et al. | 307/10.1 |
| 5,572,101 | 11/1996 | Rutkowski et al. | 318/470 |
| 5,596,253 | 1/1997 | Mizuta et al. | 318/469 |
| 5,598,918 | 2/1997 | Malecke et al. | 200/558 |
| 5,612,847 | 3/1997 | Malecke et al. | 361/58 |
| 5,623,134 | 4/1997 | Hayakawa | 200/5 R |
| 5,627,411 | 5/1997 | Bochenek | 307/10.1 |
| 5,790,419 | 8/1998 | Matsuda et al. | 364/492 |
| 5,977,732 | 11/1999 | Matsumoto | 318/283 |

*Primary Examiner*—Paul Ip
*Attorney, Agent, or Firm*—Lyon & Lyon LLP

[57] ABSTRACT

A power window apparatus for a vehicle, which has an emergency switch being capable of cutting off a power-window-closing control switch element conjointly with the operation of a switch for opening the power window and has a contactor sliding between normally closed contacts and normally open contacts provided in the form of electrode patterns on a printed circuit board, whereon electrodes extend over the contactor sliding area and a entire surface of the board except the contactor sliding area is covered with a coating of waterproof resin. The emergency switch can eliminate an abnormal simultaneous energization of both the window-opening and closing relays in an accident (such as the vehicle sinking into water) by maintaining the conducting state of the normally open contact even if the exposed portions of the electrode patterns are partly damaged by electrolysis of material.

5 Claims, 10 Drawing Sheets

F/G.3

POWER WINDOW APPARATUS

BACKGROUND OF THE INVENTION

The present invention relates to a power-window apparatus for a vehicle, which apparatus can open and close a door window by a motor-driven mechanism.

A conventional power-window apparatus is operated by using an automatic reset type power-window switch in two steps. The first step (manual mode) operation of the switch in the direction of opening or closing the window energizes a window-opening relay or a window-closing relay through a contact by which a forward (positive) or inverse driving voltage is applied to a motor which rotates in a forward or a reverse direction to move the window glass down or up to a desired extent. The second-step (temporary automatic mode) operation of the power-window switch in the window opening or closing direction actuates an auto-latching circuit for maintaining the window-opening or closing relay in an energized state to enable the motor to continue forward or reverse rotation until the window glass moves down or up to the full limit.

The conventional power-window apparatus for a vehicle, however, involves the following important problem.

The power-window apparatus normally works by energizing either the window-opening relay or the window-closing relay to apply a forward or inverse driving voltage to a driving motor of the power window mechanism depending upon the operation mode of the power window switch. However, in an accident of, e.g., the vehicle sinking into water, both the relays may happen to be energized at the same time, whereby the motor cannot rotate and the window cannot be open or shut by manipulating the power window switch.

The problem is serious because a person or persons cannot escape from the vehicle sinking into water if a driver cannot open any door window by the motor by manipulating the power-window switch.

SUMMARY OF THE INVENTION

Accordingly, a primary object of the present invention is to provide a power-window apparatus for a vehicle, which apparatus is works by switching on a control switch element consisting of either a window-opening relay or a window-closing relay to drive an actuator of the power window mechanism in the opening or closing direction depending upon the operating direction of the power-window switch, and which apparatus is further provided with an emergency switch that, in an accident (e.g., the vehicle is sinking into water) with the occurrence of abnormal simultaneous energization of both the window-opening and window-closing control-switch elements, can actuate in synchronism with manual operation of the power-window switch and turn off the window-closing control switch element, thus enabling the window to be opened by a motor.

Another object of the present invention is to provide a power-window apparatus for a vehicle, wherein an emergency switch has a contactor capable of sliding between normally closed (NC) contacts and normally open (NO) contacts provided in the form of electrode patterns on a printed board, whereon the NO contact electrodes extend over the contactor sliding area and an entire surface of the board other than the contactor sliding area is covered with a coating of waterproof resin, thus maintaining the conducting state of the NO contacts even if the exposed portions of the electrode patterns are partly damaged by electrolysis in an accident such as the vehicle is sinking into water.

DESCRIPTION OF THE PREFERRED EMBODIMENTS

Figure 1:
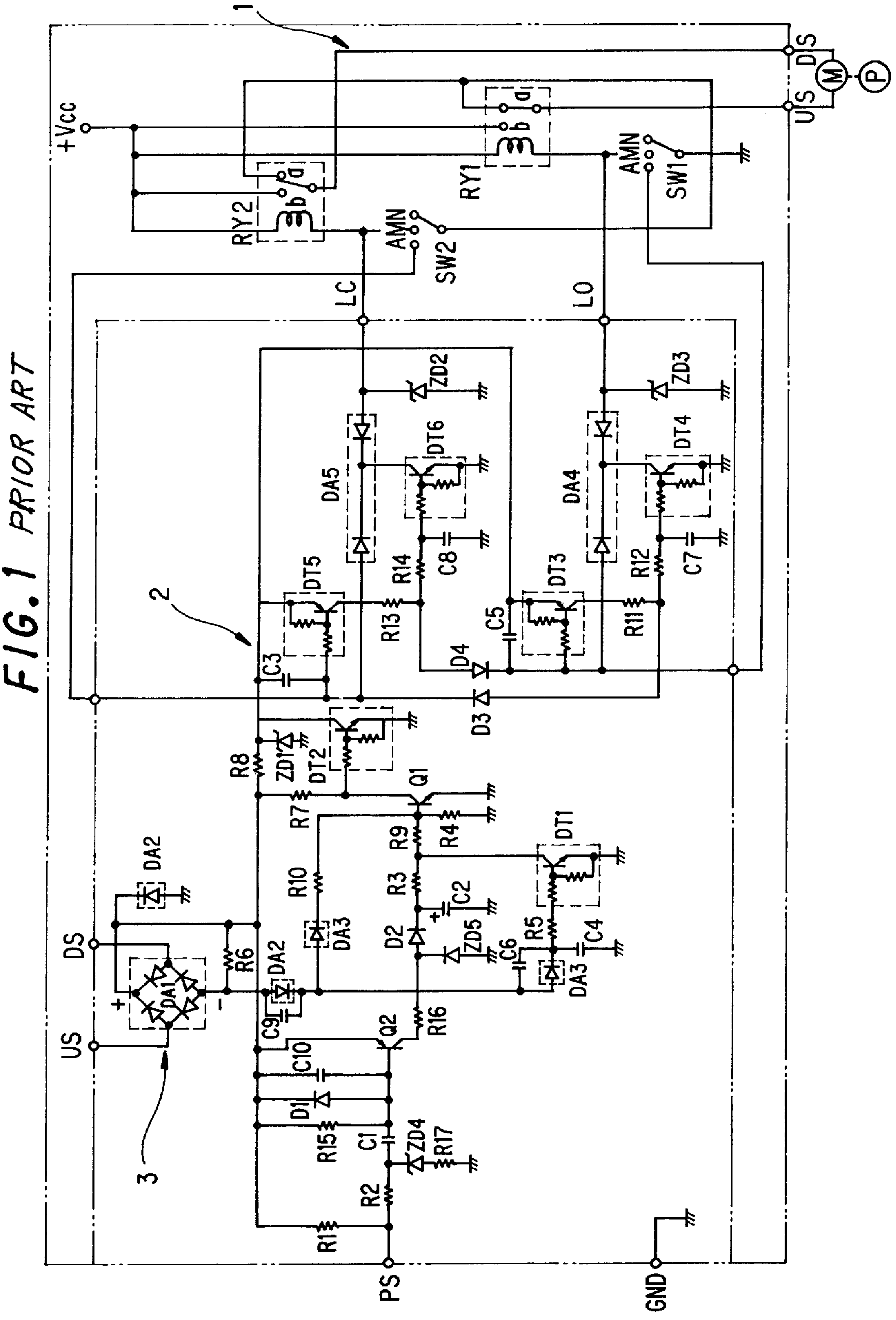
FIG. 1 PRIOR ART
FIG. 1 is a circuit diagram showing an exemplified structure of a standard electric circuit system of a conventional power window apparatus.

FIG. 1 is a typical circuit diagram showing circuit arrangements of a conventional power window apparatus. The circuit configuration includes: a drive control circuit 1 for driving a DC motor M of the door-window mechanism (not shown) into the forward or reverse rotation to open or close the window during the first-step (manual mode) operation of an automatic reset type compound power-window switch (comprising switches SW1 and SW2) in the direction of opening or closing the window; an auto-latching circuit 2 for continuing the forward or reverse rotation of the DC motor M under the control of the drive control circuit 1 until the window is fully opened or closed after the second-step (temporary automatic mode) operation of the power-window switch in the direction of opening or closing the window; and a power supply circuit 3.

Figure 2:
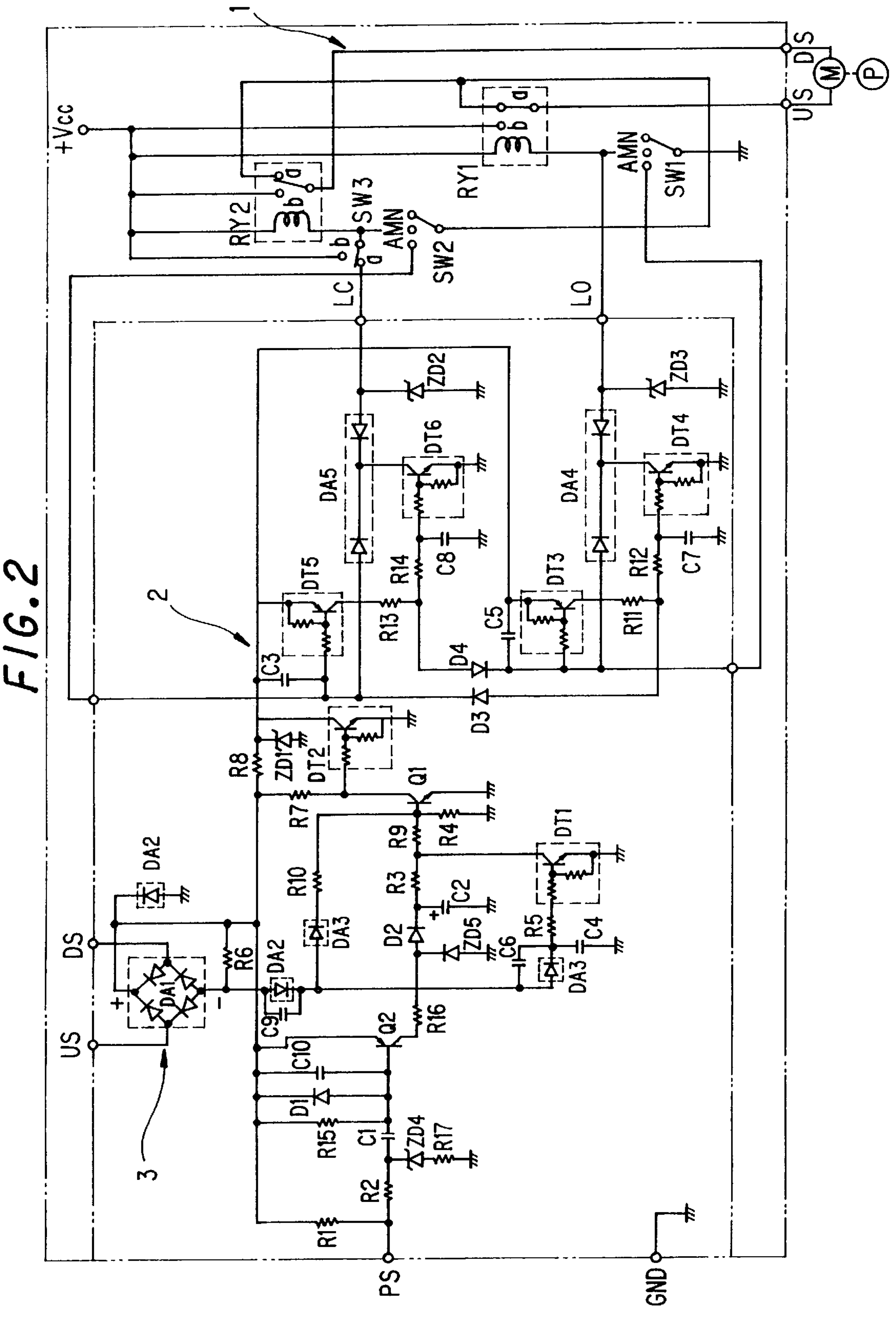
FIG. 2 is a circuit diagram showing an exemplified structure of an electric circuit system of a power window apparatus according to an aspect of the present invention.

The circuit configuration of FIGS. 1 and 2 include numerous conventional components illustrated in a conventional manner that will be readily recognized by those skilled in the art and that are identified by letters followed by a numeral. Specifically, "C", identifies a capacitor, "D" identifies a diode, "DA" identifies a diode switch, "DT" identifies a transistor switch, "Q" identifies a transistor, "R" identifies a resistor, and "ZD" identifies a zener diode. Their specific functions are conventional and will not be described in detail, except as they relate to the present invention.

The operation of the drive control circuit 1 is as follows:

When the power window switch is operated in the manual mode in the direction of opening the window, a window-opening switch SW1 closes to its contact M to energize a window-opening relay RY1, whereby a driving voltage +Vcc is applied in the forward direction to the motor M through a contact (b) of the energized window-opening relay RY1 and a contact (a) of a deenergized window-closing relay RY2. The motor M is driven in the forward rotation. When the power switch is operated in the manual mode in the direction of closing the window, a window-closing switch SW2 closes to its contact M to energize the window-closing relay RY2 and apply a driving voltage +Vcc in the inverse direction to the motor M through a contact (b) of the energized window-closing relay RY2 and a contact (a) of the deenergized window-opening relay RY1. Thus, the motor M is driven in reverse rotation.

The operation of the auto-latching circuit 2 is as follows:

When the power window-closing switch is operated in the automatic mode in the direction of opening the window, the window-opening switch SW1 closes first to its contact M and then temporarily closes to its contact A and the power supply circuit 3 provides an output voltage to turn on transistor switches DT3 and DT4 of the auto-latching circuit 2 (with a transistor switch DT2 turned off). At a low level of a window-opening latch line LO, the window-opening relay RY1 is energized and the motor M continues its rotation in the forward direction.

In synchronism with rotations of the motor M, the pulser P generates pulse signals PS to be given to the auto-latching circuit 2.

With the pulse signals PS on the auto-latching circuit 2, the transistor switch DT2 is turned off and the switch SW1 is reset to the neutral position N. The transistor switches DT3 and DT4 are held in the ON state, so the window opening relay RY1 is energized and the motor continues its forward rotation.

When the motor M stops with the window fully opened, the pulse PS will not be given to the auto-latching circuit and the transistor switch DT2 is turned on. At the same time, transistor switches DT3 and DT4 are turned off and the window-opening latch line LO attains a high level to deenergize the window-opening relay RY1 and remove the voltage +Vcc from the motor M.

When the power-window switch is operated in the automatic mode in the direction of closing the window, the window-opening switch SW2 closes to its contact M first and then temporarily closes to its contact A, whereby the power supply circuit 3 provides an output voltage to turn on transistor switches DT5 and DT6 of the auto-latching circuit 2 (with a transistor switch DT2 turned off). At a low level of a window-opening latch line LC, the window-closing relay RY2 is energized and the motor M is driven into reverse rotation.

With the pulse signal PS applied again to the auto-latching circuit 2, the transistor switch DT2 remains turned off and the switch SW1 is reset to the neutral position N. The transistor switches DT5 and DT6 are held in the ON state, whereby the window closing relay RY2 is energized to keep the motor rotating in the reverse direction.

When the motor M stops with the window fully closed, the pulse PS will not be given to the auto-latching circuit 2 and the transistor switch DT2 is turned on. At the same time, transistor switches DT5 and DT6 are turned off and the window-closing latch line LC attains a high level to deenergize the window-closing relay RY2 and remove the voltage +Vcc from the motor M.

In the event of the vehicle having an accident of, e.g., sinking into water, the above power window apparatus may have the auto-latching circuit 2 short-circuited to drop levels of both the window-opening and window-closing latch lines LO and LC, so both the window-opening and window-closing relays RY1 and RY2 are energized at the same time, making it impossible to drive the motor M by the power window switch.

Accordingly, the present invention provides the power window apparatus with an emergency switch SW3 shown in FIG. 2, which switch actuates simultaneously with the manual operation of the power-window switch in the direction of opening the window and forcibly cuts off the window-closing latch line LC in the auto-latching circuit 2 to make the window-closing relay RY2 short-circuited.

The power window apparatus provided with the above-described switch is capable of opening a vehicle door-window by manipulating the power window switch in the window-opening direction even if auto-latching circuit 2 is short-circuited and both the window-opening and window-closing relays RY1 and RY2 are simultaneously energized in an accident of a vehicle sinking into water. This is realized by the switch SW3 that actuates simultaneously with the manual operation of the power-window switch SW1 and cuts off the window-closing latch line LC being at an abnormally low level to deenergize the window-closing relay RY2. Consequently, only window-opening relay RY1 is held in the energized state and the motor M is driven into forward rotation for opening the door window.

Figure 3:
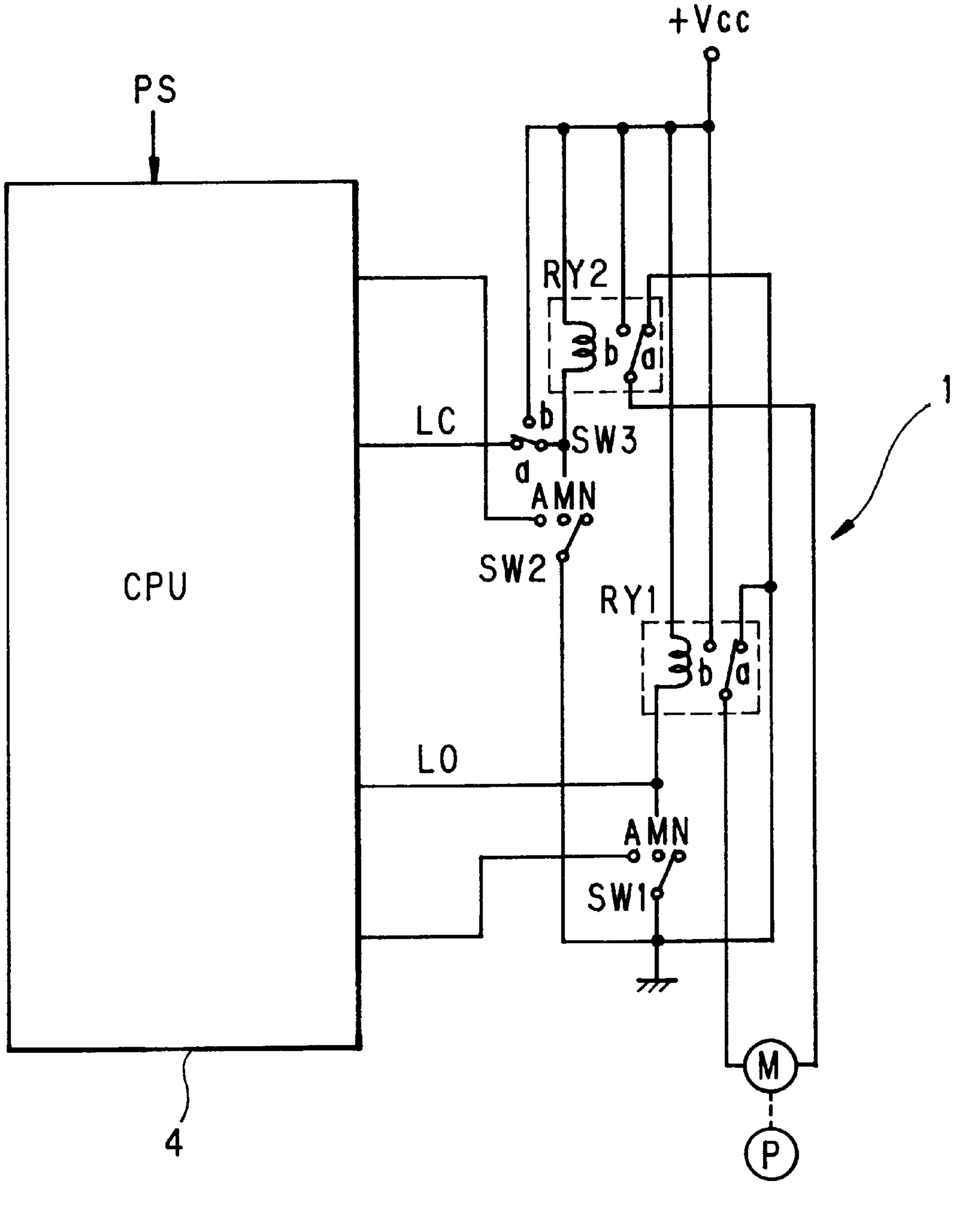
FIG. 3 is a circuit diagram showing an exemplified structure of an electric circuit system of a power window apparatus according to another aspect of the present invention.

FIG. 3 illustrates another embodiment of the present invention.

In this embodiment, a control unit 4 that is a central processing unit (CPU) for executing centralized control of vehicle door-related operations (e.g., for opening and closing respective door windows, switching ON and OFF door locks, turning ON and OFF door lamps and adjusting a power-driven mirror) can also perform the auto-latching function of the power-window and is further provided with an emergency switch SW3 that can actuate simultaneously with the manual operation of a power window switch and makes a window-closing relay coil short-circuited by disconnecting a control circuit for energizing the window-closing relay in the control unit (CPU) 4.

Figure 4:
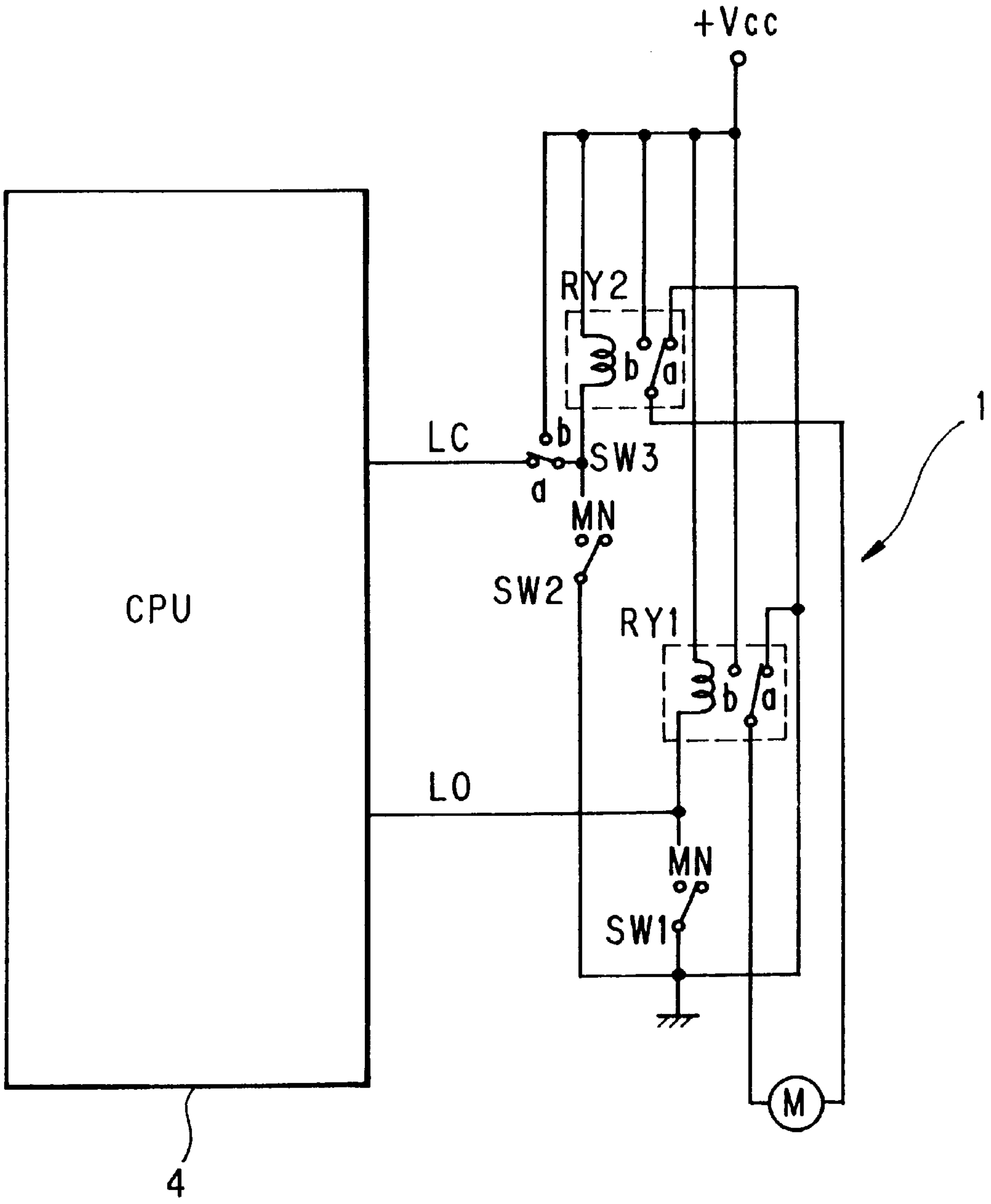
FIG. 4 is a circuit diagram showing an exemplified structure of an electric circuit system of a power window apparatus according to a further aspect of the present invention.

FIG. 4 illustrates a further embodiment of the present invention.

This embodiment is applied in particular to a power-window apparatus intended to operate a window-opening switch SW1 and a window-closing switch SW2 in a manual mode only and has no auto-latching function. Namely, the power-window apparatus according to the embodiment can open and close a window of a vehicle during the manual operation of the window-opening switch SW1 and the window-closing switch SW2, respectively, and also by energizing a window-opening relay RY1 and a window-closing relay RY2, respectively, under the control of a control unit (CPU) 4 for executing concentrated control of vehicle door-related functions (e.g., opening/closing respective door-windows, switching ON and OFF door locks, turning ON and OFF door lamps and adjusting a power-driven mirror) and is further provided with a switch SW3 that can actuate simultaneously with the manual operation of a power window switch in the window-opening direction to short-circuit the window-closing relay coil by disconnecting a control line LC for energizing the window-closing relay RY2 in the control unit (CPU) 4.

In practice, a plurality of the power-window apparatuses may be provided, one for each of the door-windows (e.g., an assistant-seat-side door-window and the back-seat-side door-windows) of the vehicle, and all the power-window switches are arranged on an operation panel in front of the driver's seat. When the driver manually operates any power-window switch, a command signal is produced and sent to the control unit (CPU) 4 which in turn executes the control operation for opening or closing a designated window.

Similarly to the embodiment described with reference to FIG. 2, both the embodiments of FIGS. 3 and 4 are capable of opening a door-window by manually operating the power-window switch in the window opening direction even if the control unit (CPU) 4 is short-circuited causing simultaneous actuation of window-opening and closing relays RY1 and RY2 in a motor-drive control circuit 1 in an accident of, e.g., the vehicle sinking into water. This is realized by the effect of the emergency switch SW3 that in the same case actuates with the manual operation of the power-window switch in the window-opening direction and disconnects the window-closing latch line LC from being at an abnormal low-level in the control unit (CPU) 4 and deenergizes the window-closing relay RY2 to drive the motor M in the forward direction.

Figure 5:
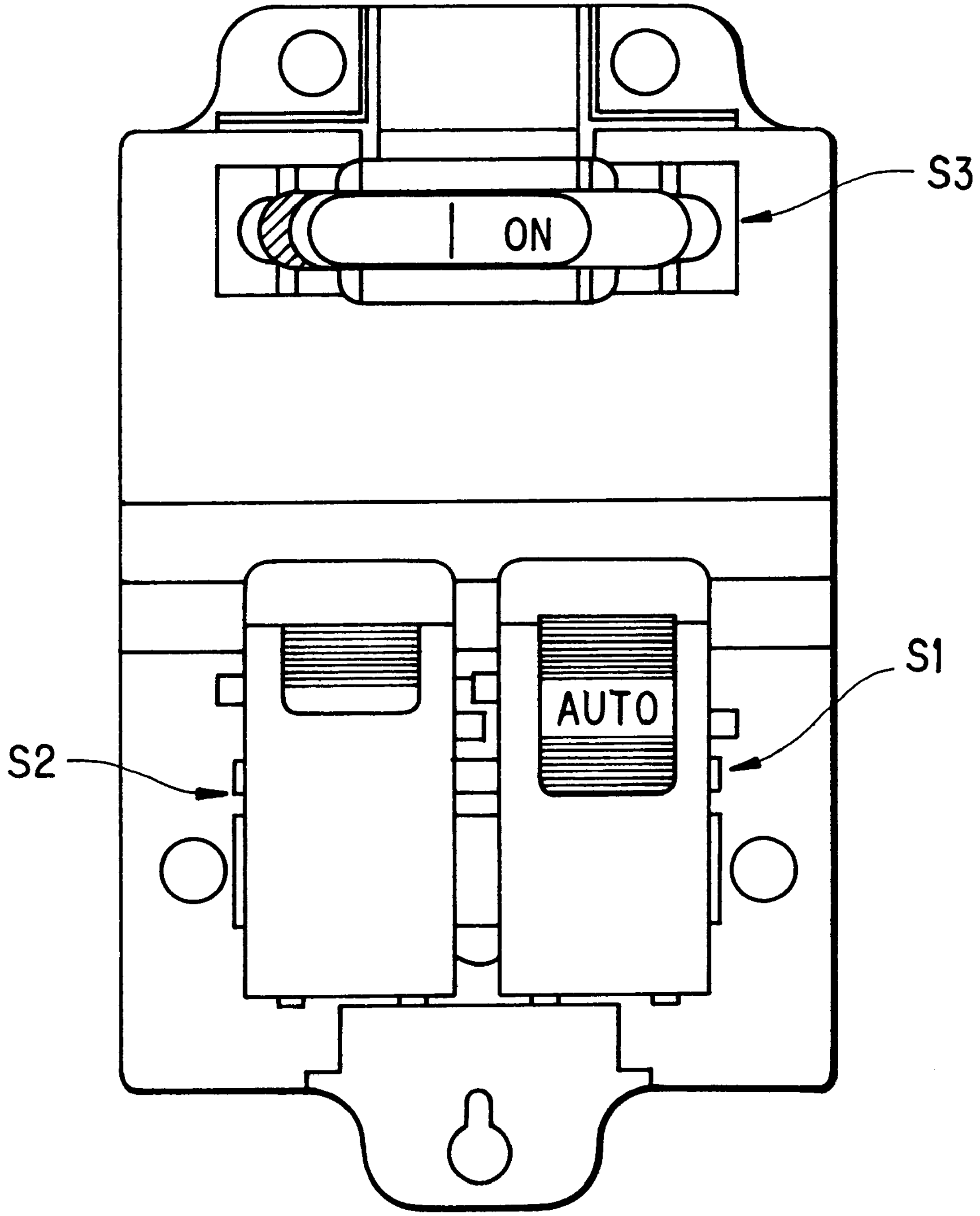
FIG. 5 is a plan view of an exemplified power switch unit of a power window apparatus according to an aspect of the present invention.
Figure 6:
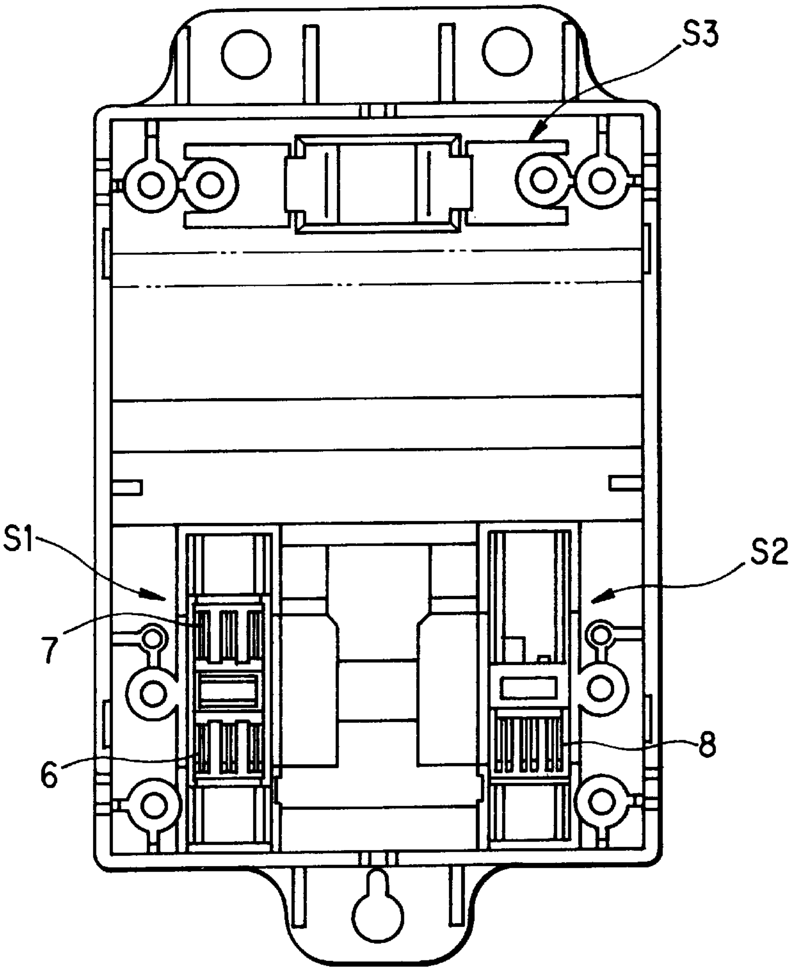
FIG. 6 is a bottom view of the power switch unit of FIG. 5.
Figure 7:
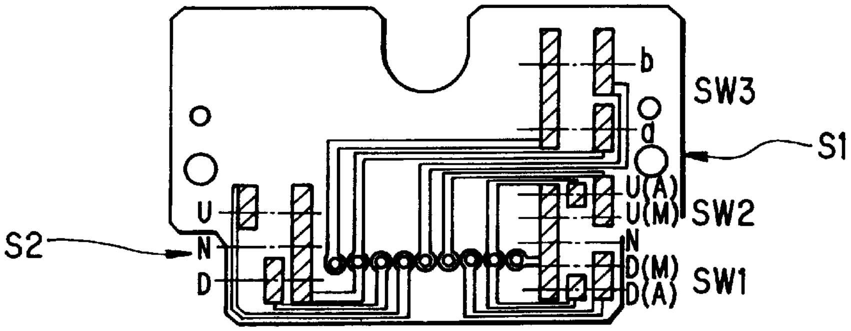
FIG. 7 is a plan view showing a structure of respective contacts of the power switch unit of FIG. 5.

FIGS. 5 to 7 illustrates an exemplified construction of a power switch unit having an auto-latching function, which is used in a power window apparatus according to an aspect of the present invention.

As shown in FIGS. 5 to 7, the power switch unit incorporates an operation switch section S1 with an auto-latching function for opening a driver-seat-side door window, an operation switch section S2 for manually opening and closing an assistant-seat-side door window and an operation switch section S3 for turning on and off the power circuit of the operation switch section S2. The switch sections S1, S2 and S3 are seesaw type push-button switches respectively.

In FIG. 7, the operation switch section S1 includes contacts of a window-opening switch SW1, a window-closing switch SW2 and an emergency switch SW3.

With the operation switch section S1 set in the neutral position, a contactor 6 (FIG. 6) rests in the N position shown in FIG. 7. When the switch section S1 is depressed at its front part to the manual mode position, the contactor 6 slides to the D (M) position (FIG. 7) to output a window-opening signal. When the operation switch section 1 is further depressed at its front part to the automatic operation position, the contactor slides to the D(A) position (FIG. 7) to output an auto-latching signal for opening a door window. When the switch section S1 is depressed at its rear part to the manual mode position, the contactor 6 slides to the U(M) position (FIG. 7) to output a window-closing signal. When the operation switch section 1 is further depressed at its rear part to the automatic operation position, the contactor slides to the U(A) position (FIG. 7) to output an auto-latching signal for closing the door window.

With the operation switch section S1 in the neutral position, a contactor 7 (FIG. 6) of emergency switch SW3 is set in the "a" position shown in FIG. 7. When the switch section S1 is depressed at its front part to a position over the manual mode position, the contactor 7 of emergency switch SW3 slides to the "b" position (FIG. 7) to forcibly shut off the auto-latch line LC shown in FIGS. 2 to 4 as described before. This causes the coil of the window-closing relay RY2 to be short-circuited.

Similarly to the above, the switch section S2 operates as follows:

With the control switch section S2 in the neutral position, its contactor 8 (FIG. 6) is set in the N position shown in FIG. 7. When the control switch section S2 is depressed at its front part, the contactor 8 slides to the D position (FIG. 7) to output a window-opening signal. When the control switch section S1 is depressed at its rear part, the contactor 8 slides to the U position (FIG. 7) to output a door-closing signal.

Figure 8:
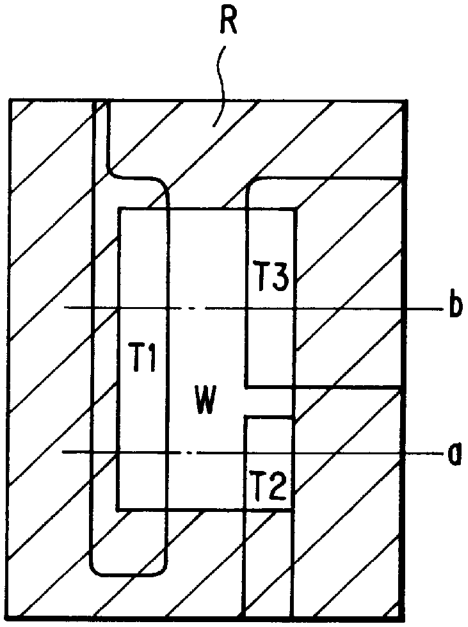
FIG. 8 shows electrolyte-protected electrode patterns formed on a printed circuit board, which patterns are contacts of an emergency switch in the power switch unit of FIG. 6 according to the present invention.

In the power window apparatus provided with the above-described power switch unit, as shown in FIG. 8 the emergency switch SW3 has contacts T1 to T3 formed as respective electrode patterns on a printed circuit board and has a contactor (7) sliding a distance W between a position "a" for short-circuiting the contact T1 to the contact T2 and a position "b" for short-circuiting the contact T1 to the contact T3. The electrode patterns T1 and T3 are extended over the distance area W and their portions outside the distance area W are covered each with a coating of waterproof resin R.

In an accident of the vehicle sinking into water, the portions of the positive electrode patterns T1 and T3, which are exposed within the distance W on the printed circuit board, may be partly damaged by electrolysis of material but the electrical connection between the contacts T1 and T3 can be maintained through their protected portions with the emergency switch contactor SW being in the position "b".

Figure 9:
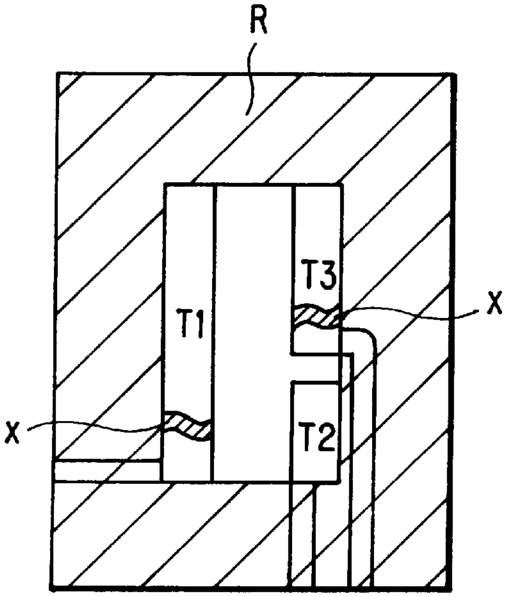
FIG. 9 shows electrolyte-unprotected electrode patterns formed on a printed circuit board, which patterns are contacts of an emergency switch in the power switch unit of FIG. 6.

It must be noted that no protection can be realized if the contact patterns T1 to T3 are formed within the contactor sliding area W only on the printed circuit board and other areas are covered with a resin coating as shown in FIG. 9. In this instance, the contactor (7) cannot maintain the conductivity between the contacts T1 and T3 if the contact portions exposed within the distance W were damaged partly (e.g., at parts "x" shown in FIG. 9) by electrolysis.

The power window apparatus according to the present invention enables the driver and the assistant driver of the vehicle to open door windows by manual operation until the positive electrode patterns of the power control switch unit S1 are entirely damaged by electrolysis in an accident of the vehicle sinking into water. Namely, the emergency switch SW3 in the position "b" can maintain the conducting state of the short-circuited contacts T1 and T3 for five minutes or more after the vehicle sank in water.

The negative electrode pattern corresponding to the normally open contact T2 of the emergency switch SW3 cannot be electrolytically damaged in the accident of the vehicle sinking into water.

Figure 10:
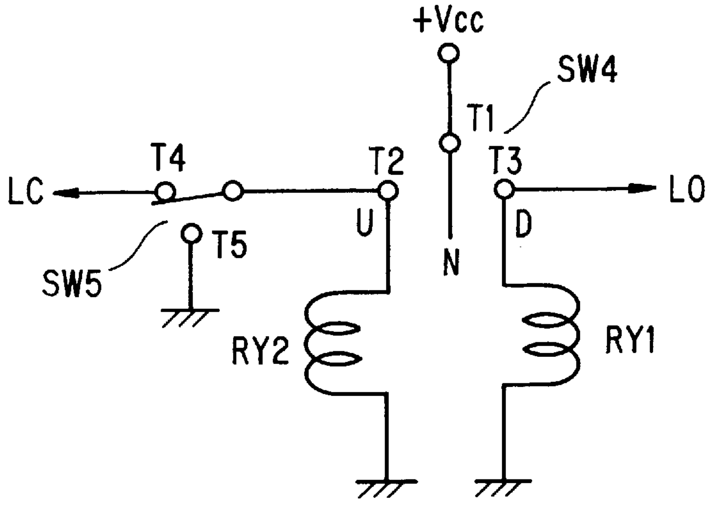
FIG. 10 is a circuit diagram showing an exemplified structure of switches of a power window apparatus according to another aspect of the present invention.
Figure 12:
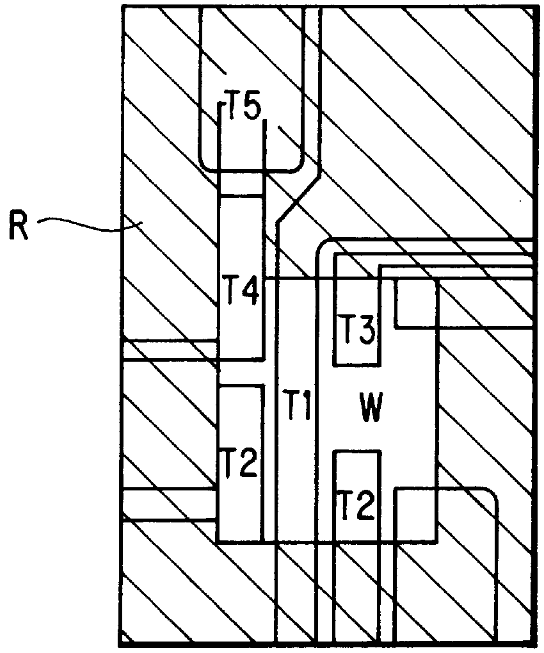
FIG. 12 shows another example of electrode patterns formed on a printed circuit board, which patterns are contacts of the switch of FIG. 10.

FIGS. 10 and 12 shows another construction of power switch unit according to another aspect of the present invention. The unit includes an operation switch SW4 for causing the vehicle door-windows to be opened and closed and an emergency switch SW5 for actuating conjointly with the operation of the operation switch SW4.

With a contactor of the operation switch SW4 in the neutral position N, a contactor of the emergency switch SW5 is in the position for short-circuiting normally closed contacts T2 and T4 connected to an auto-latch line LC for closing the door window. When the contactor of the operation switch SW4 is set in the U position for closing the contacts T1 and T2 to energize the door-window closing relay RY2 the contactor of the emergency switch SW5 is set in the position for short-circuiting normally closed contacts T2 and T4 connected to an auto-latch line LC for closing the door window. When the contactor of the operation switch SW4 is set in the D position for closing the contacts T1 and T3 to energize the door-window opening relay RY1, the contactor of the emergency switch SW5 is set in the position for short-circuiting normally closed contacts T2 and T5 connected to an auto-latch line LO for opening the door window.

FIG. 12 shows another example of electrode patterns formed on a printed circuit board of the power switch unit, which patterns have connections reverse in polarity to those of the switch unit shown in FIG. 10.

Figure 11:
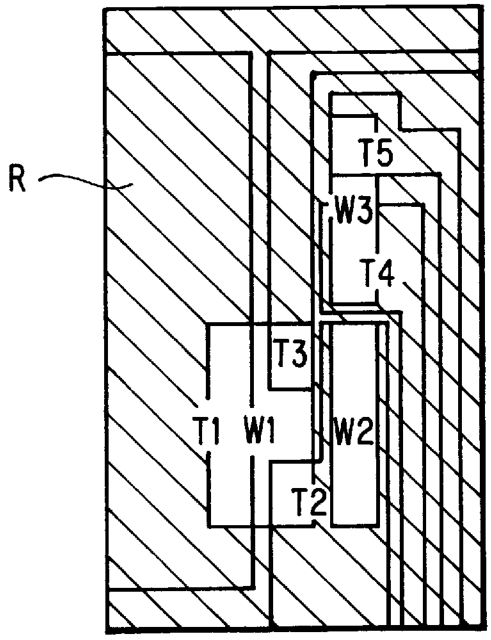
FIG. 11 shows exemplified electrode patterns formed on a printed circuit board, which patterns are contacts of the switch of FIG. 10.

The electrode patterns T1–T5 shown in FIGS. 11 and 12 extend over the contactor sliding areas W1–W3 on the printed circuit board and the electrode portions except the portions exposed within the corresponding distance areas W1–W3 are all covered with a coating of waterproof resin R.

In this instance, the positive electrode pattern and negative electrode pattern can be crossed over each other on the printed circuit board by interfacially connecting the negative electrode pattern through through-holes made therein.

Figure 13:
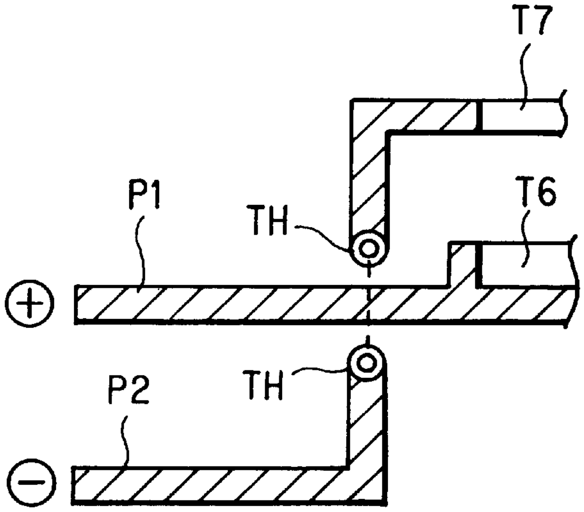
FIG. 13 shows an exemplified circuit diagram in which a cathode (negative electrode) pattern having a through hole made therein for interfacial connection across an anode (positive electrode) pattern.

As shown by way of example in FIG. 13, an electrode pattern P1 at a lead of a positive side contact T6 and an electrode pattern at a lead of negative side contact T7 are crossed over by providing through holes TH in the latter electrode pattern P2 for interfacial connection of the negative side contact T7 there through.

Figure 14:
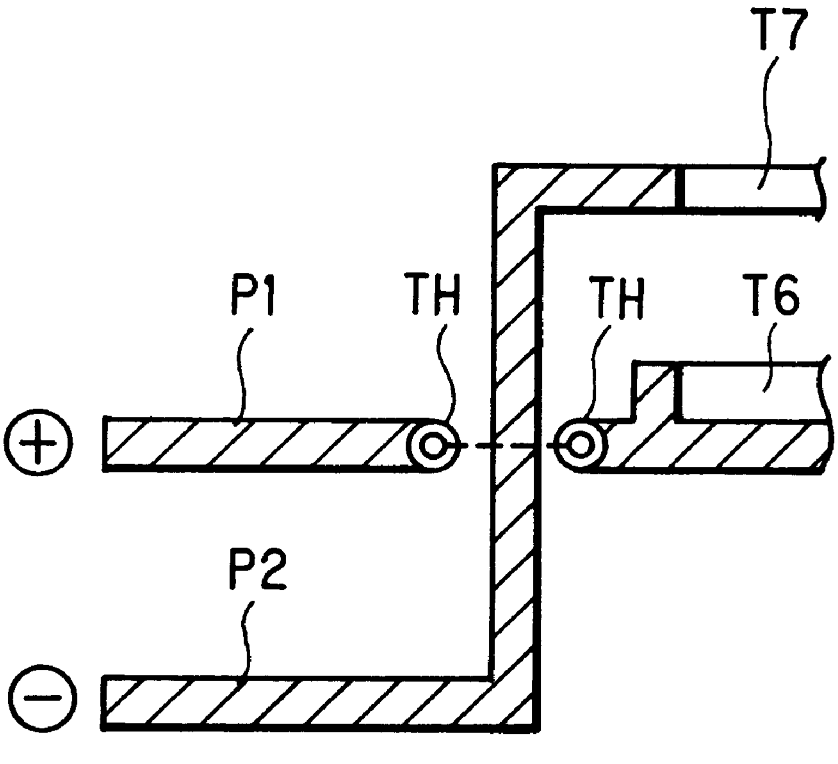
FIG. 14 shows an exemplified circuit diagram in which an anode (positive electrode) pattern having a through hole made therein for interfacial connection across a cathode (negative electrode) pattern.

If the through holes TH are made in the positive electrode pattern Pi as shown in FIG. 14, the through holes cannot be is covered with a protective resin coating (only hatched portions can be covered). Consequently, the exposed portion of the positive electrode pattern Pi may be electrolytically damaged in the accident of the vehicle sinking into water.

The provision of through holes TH in the negative electrode pattern P2 makes it possible to entirely protect the positive electrode pattern P1 with a waterproof resin coating. This also eliminates the possibility of damaging the exposed portion of the negative electrode pattern P2 in an accident of the vehicle sinking into water.

Although the preferred embodiments described above use relays as control switching elements for opening and closing the door windows, the present invention is not limited to the above and can be embodied with use of other kinds of control switching elements, e.g., transistors in place of the relays.

As is apparent from the foregoing, the power-window apparatus according to an aspect of the present invention is capable of opening or closing a door window of a vehicle by manual operation of a power-window switch energizing either of the control switch elements for driving an actuator of the window mechanism in the window opening or closing direction, and is further provided with an emergency switch that can actuate simultaneously with the manual operation of the power-window switch in the window-opening direction and turning off the widow-closing control switch element. The provision of the emergency switch can effectively eliminate the abnormal simultaneous actuation of both the window-opening and window-closing control switch elements in an accident, e.g., when the vehicle is sinking into water, thus enabling the driver to open the window.

The emergency switch of the power-window apparatus according to the present invention has normally closed contacts and normally open contacts provided in the form of elongated electrode patterns formed on a printed circuit board and has a contactor sliding a distance between the NC contacts and NO contacts. The emergency switch is featured by the fact that the respective electrodes are extending over the contactor sliding area on the printed circuit board and the whole surface of the printed circuit board other than the contactor sliding area is covered with a waterproof resin coating. Owing to the above construction, the emergency switch can maintain the electrical conductivity between the normally open contacts, thus enabling the door window of the vehicle to be opened even if the electrode patterns exposed in the contactor sliding area are partly damaged by electrolysis in an accident of the vehicle sinking into water.

What is claimed is:

1. A power window apparatus for opening or closing a window by operation of a power-window switch in a window-opening or closing direction, said operation energizing a window-opening or window-closing control-switch element to drive an actuator of a power-window mechanism, wherein the apparatus is further provided with a switch actuating conjointly with the operation of the power-window switch in the window-opening direction and causing the window-closing control-switch element to change from an ON state to an OFF state, which switch has a contactor being capable of sliding a distance between normally closed contacts and normally open contacts provided in the form of electrode patterns, said normally open contacts extending over the contactor sliding area on a printed circuit board whose surface other than the contactor sliding area is all covered with a waterproof resin coating.

2. A power window apparatus for opening or closing a window by manual operation of a power-window switch in a window-opening or closing direction, said operation energizing a window-opening control switch element or a window-closing control switch element to drive an actuator of a power-window mechanism for opening or closing the window during the manual operation, and by temporary automatic operation of the power-window switch in the window-opening or closing direction, said automatic operation causing an auto-latching circuit to hold the window-opening control-switch element or the window-closing control-switch element in the energized state for maintaining the operation of the actuator of the power-window mechanism until the window becomes fully opened or closed, wherein the apparatus is further provided with a switch actuating conjointly with the manual operation of the power-window switch in the window-opening direction and turning off the window-closing control-switch element by disconnecting a control circuit of an auto-latch line for the window-closing control-switch element, which switch has a contactor being capable of sliding a distance between normally closed contacts and normally open contacts provided in the form of electrode patterns, said normally open contacts extending over the contactor sliding area on a printed circuit board whose surface other than the contactor sliding area is all covered with a waterproof resin coating.

3. A power window apparatus for opening or closing a window by manual operation of a power-window switch in a window-opening or closing direction, said operation energizing a window-opening control switch element or a window-closing control switch element to drive an actuator of a power-window mechanism for opening or closing the window during the manual operation, and by temporary automatic operation of the power-window switch in the window-opening or closing direction, said automatic operation causing a control unit to hold the window-opening control-switch element or the window-closing control-switch element in the energized state for maintaining the operation of the actuator of the power-window mechanism until the window becomes fully opened or closed, wherein the apparatus is further provided with a switch actuating conjointly with the manual operation of the power-window switch in the window-opening direction and turning off the window-closing control-switch element by disconnecting a control line for energizing the window-closing control-switch element, which switch has a contactor being capable of sliding a distance between pairs of normally closed contacts and normally open contacts formed in the form of electrode patterns, said normally open contacts extending over the contactor sliding area on a printed circuit board whose surface other than the contactor sliding area is all covered with a waterproof resin coating.

4. A power window apparatus for opening or closing a window by manual operation of a power-window switch in a window-opening or closing direction, said operation energizing a window-opening control switch element or a window-closing control switch element to drive an actuator of a power-window mechanism for opening or closing the window during the manual operation, and by turning on the window-opening or closing control switch element under the control of a control unit to drive the actuator of the power-window mechanism, wherein the apparatus is further provided with a switch actuating conjointly with the manual operation of the power-window switch in the window-opening direction and turning off the window-closing control-switch element by disconnecting a control line for energizing the window-closing control-switch element, which switch has a contactor being capable of sliding a distance between normally closed contacts and normally open contacts provided in the form of electrode patterns, said normally open contacts extending over the contactor sliding area on a printed circuit board whose surface other than the contactor sliding area is all covered with a waterproof resin coating.

5. A power window apparatus as defined in any one of claims 1 to 4, characterized in that a positive-side electrode pattern and a negative-side electrode pattern are formed on the printed circuit board with through holes made therein for interfacial connection of the negative-side electrode pattern across the positive-side electrode pattern.

* * * * *